SYSTEM FOR MAGNETIC RECORDING

Filed Nov. 17, 1955 3 Sheets-Sheet 1

INVENTOR

Robert H. Berkshire

BY Stevens, Davis, Miller and Mosher

ATTORNEYS

July 3, 1962 R. H. BERKSHIRE 3,042,755

SYSTEM FOR MAGNETIC RECORDING

Filed Nov. 17, 1955 3 Sheets-Sheet 2

INVENTOR

Robert H. Berkshire

BY Stevens, Davis, Miller and Mosher

ATTORNEYS

July 3, 1962 R. H. BERKSHIRE 3,042,755

SYSTEM FOR MAGNETIC RECORDING

Filed Nov. 17, 1955 3 Sheets-Sheet 3

INVENTOR
Robert H. Berkshire

BY Stevens, Davis, Miller and Mosher
ATTORNEYS

United States Patent Office 3,042,755

Patented July 3, 1962

3,042,755
SYSTEM FOR MAGNETIC RECORDING

Robert H. Berkshire, Dallas, Tex., assignor to Texas Instruments Incorporated, Dallas, Tex., a corporation of Delaware Filed Nov. 17, 1955, Ser. No. 547,453
12 Claims. (Cl. 179—100.2)

This invention relates to a system for multi-channel recording on a magnetic medium and more particularly to a system for multi-channel recording on both sides of a magnetizable coated disk.

The concept of multi-channel recording has been advanced in the art of magnetic recording in recent years. Principally, this technique is useful in obtaining side-by-side recordings of complex wave forms which can be later studied and compared. One specific adaptation of multi-channel recording is in the field of seismic surveying wherein it has been proposed to record the signal outputs from the plurality of seismometers forming a spread magnetically and in side-by-side relation. It is customary in this work to arrange a plurality of seismometers in a predetermined geometrical pattern relative to the earth's surface with reference to a shot point. Upon the firing of a suitable charge at the shot point, seismic waves are passed into the earth and reflected from various horizons defined by the underlying strata. The reflected waves are picked up by the seismometers and translated into corresponding electrical signals. It has been proposed to record the output of each seismometer over a wide frequency band and at a subsequent future time to play back each recording through various filters in order to study various narrow frequency bands and compare these with similar bands derived from the outputs of companion seismometers. Since it is proposed to record magnetically the outputs of the plurality of seismometers, it becomes essential to provide a means whereby this can readily and easily be accomplished, especially in the field. It has heretofore been proposed to record the outputs of the seismometers on a moving tape. This means, however, quite definitely limits the number of signals which can be recorded by a single apparatus and thus limits indirectly the number of seismometers to be used in the spread unless the ex- will be noted, in FIGURES 1 and 2 there is provided a borne.

It is accordingly an object of the present invention to provide a system for magnetic recording of seismic signals which makes available a very large number of recording channels by using in place of tape or the equivalent, a disk which is coated on both sides with a magnetizable medium whereby the both sides are available to receive magnetic recordings simultaneously or independently.

It is a further object of the present invention to provide a system for magnetically recording a large number of independent signals upon a disk which system will enable the recording of a maximum number of such signals and is arranged to effect the recording and playback of the signals in an efficient and expedient manner by making full use of the available recording space.

It is a still further object of the present invention to provide a system for magnetically recording a plurality of seismic signals side by side on both surfaces of a disk which will facilitate seismic surveying work and greatly increase the number of seismometers which may be employed in any given spread.

Other and further objects of the present invention will become more fully apparent from the detailed description taken in conjunction with the drawings in which.

Figure 1:
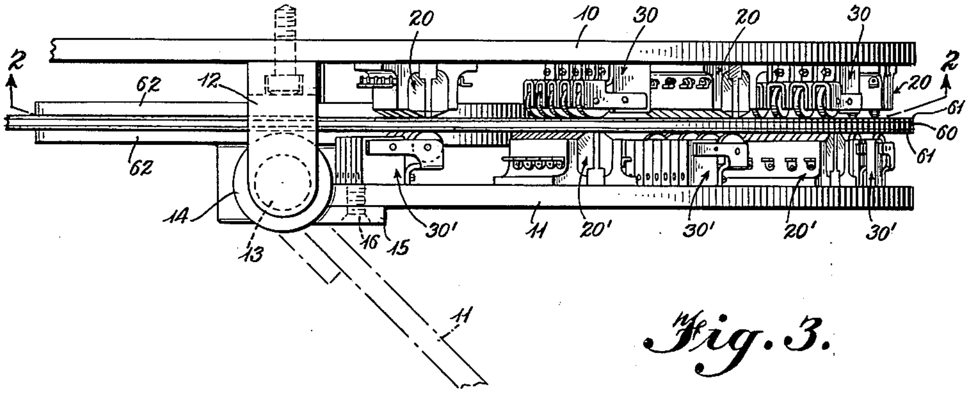
FIGURE 1 is a top plan view of the apparatus employed in the present invention.

Referring now to the drawings, there will be described a preferred embodiment of the present invention. As will be noted, in FIGURES 1 and 2 there is provided a main backing plate 10 to which is pivotally attached along its vertical diameter a half-plate 11. The pivotal attachment consists essentially of a bracket 12 fixed to the back plate 10, a pin 13 depending from the bracket 12 and a hinge 14 mounted on pin 13 and having a flange 15 to which the halfplate 11 is attached by any suitable means as, for example, bolts 16. It will be understood that any equivalent pivotal mounting structure can be adapted for half-plate 11. In FIGURE 1, the dotted line illustrates the position of the half-plate 11 when it is pivoted with respect to the backing plate 10. Mounted on the opposing faces of the plate 10 and the half-plate 11 are a series of multi-unit electromagnetic heads generally designated by the numeral 20.

Figure 2:
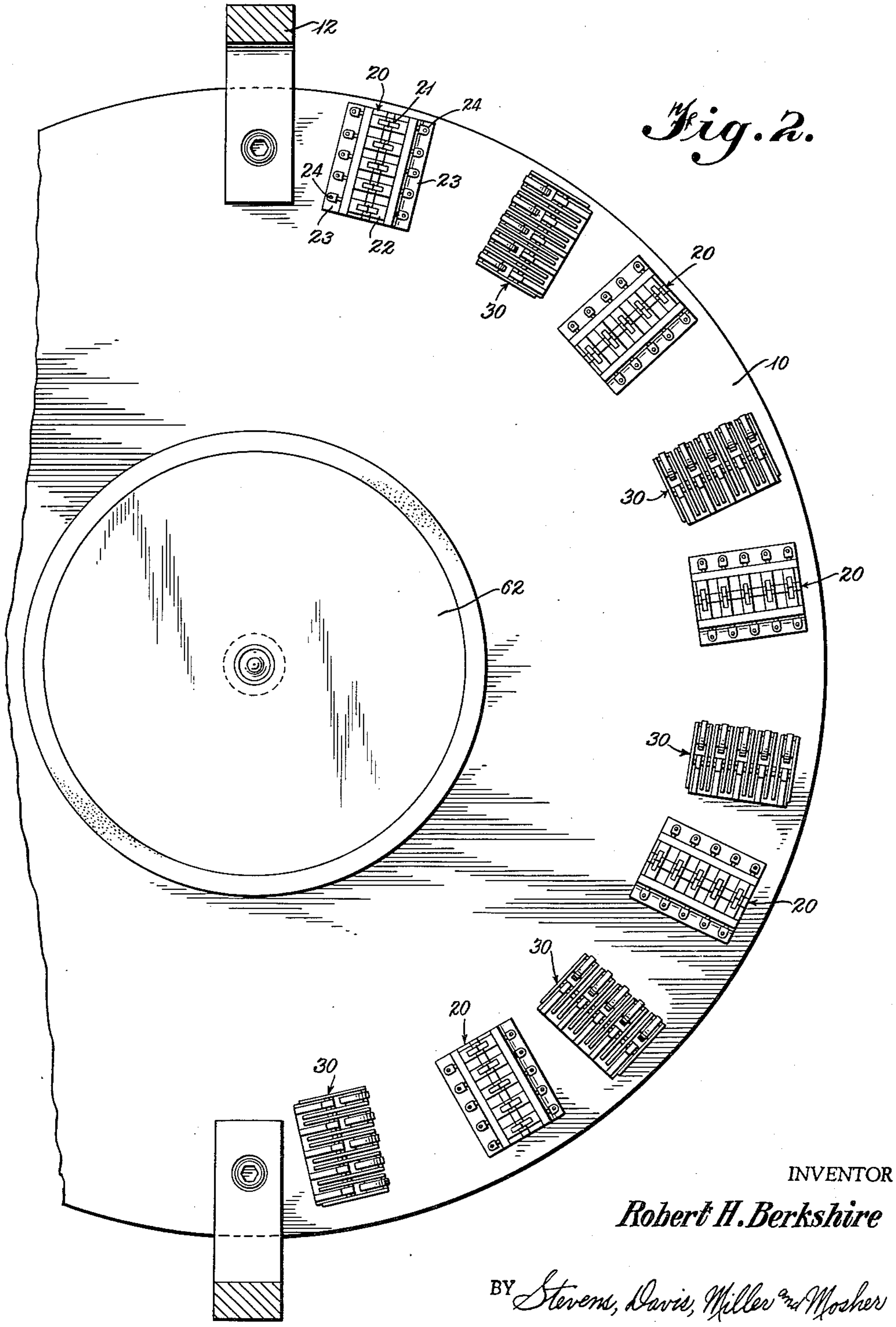
FIGURE 2 is a view in section taken along line 2—2 of FIGURE 1.
Figure 5:
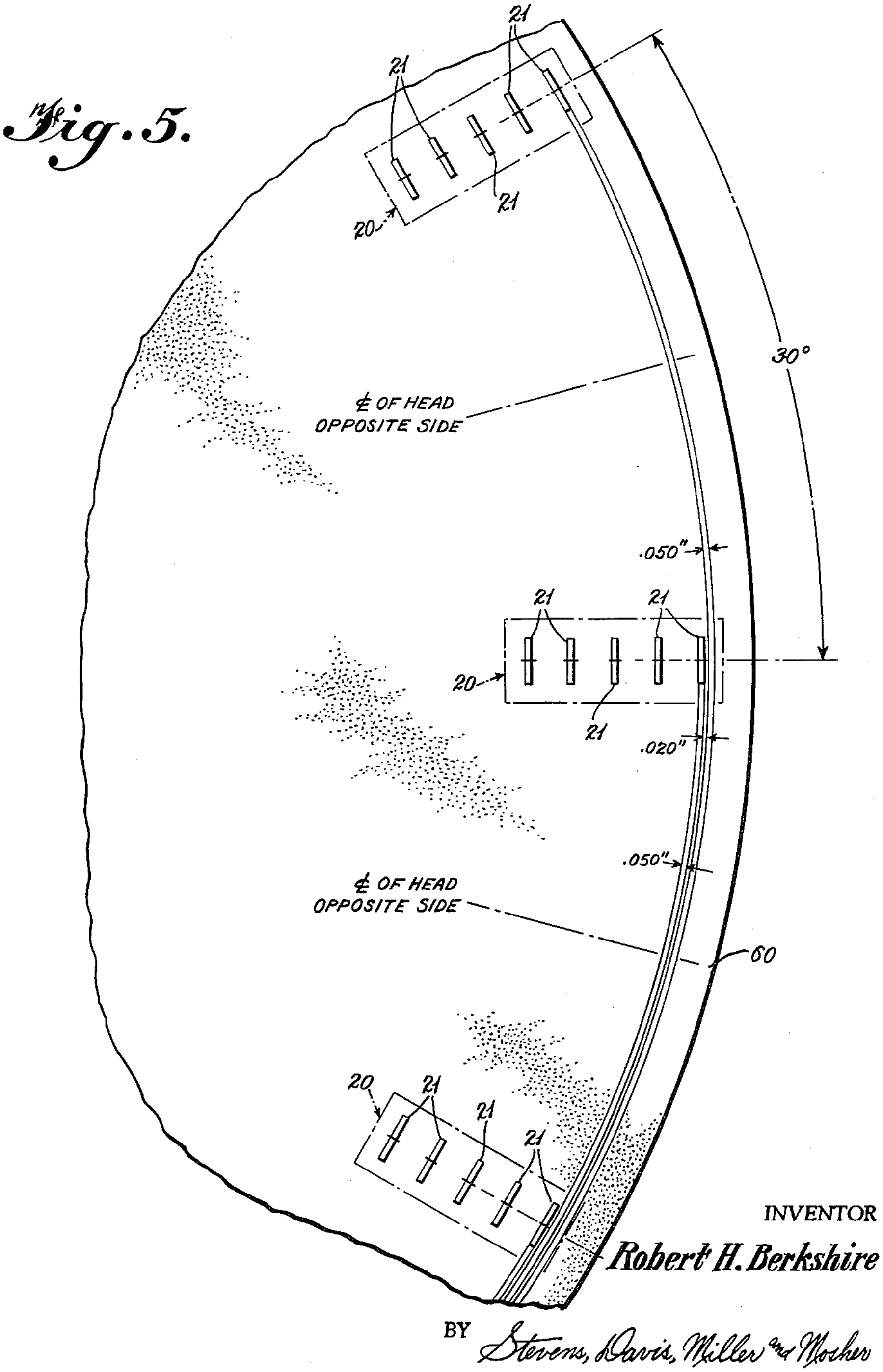
FIGURE 5 is a schematic view illustrating the arrangement of multi-unit electromagnetic heads with reference to a recording disk to achieve the most efficient utilization of available space.

As shown in FIGURE 2, each multi-unit head is comprised of five electromagnetic heads 21 encapsulated in a plastic mass 22 which bonds them to terminal blocks 23, the terminal being designated by 24. Each head 21 is substantially rectangular in shape and defines a gap in the exposed portion. Each head 21 has two coils, one coil wrapped around each of the two legs of its magnetic core, and one lead from each coil is brought to a corresponding terminal 24 and the other leads from the coils are tied together within the plastic mass 22. Five such multi-unit heads are angularly spaced along the surface of the plate 10 near its periphery over less than a 180° arc. It is preferred that the heads 20 be spaced apart approximately 30°, this feature being shown graphically in FIGURE 5. Clockwise of each multi-unit head 20, as shown in FIGURE 2, there is attached on the plate 10 a backup roller assembly generally designated by the numeral 30. Each backup roller assembly consists of five backup rollers with the axes of the rollers disposed at approximately a 15° angle from the centerline of the adjacent multi-unit head 20. There is mounted on the plate 11 an arrangement similar to that mounted on plate 10. Since the sets of units are identical, they have been designated by the same reference numerals suffixed with a prime. The set of five backup roller assemblies 30′ mounted on plate 11 are angularly and radially aligned to coincide with the set of five multi-unit heads 20 on the plate 10. Likewise, the set of five multi-unit heads 20′ on the plate 11 are angularly and radially aligned to coincide with the set of five backup roller assemblies 30 on the plate 10. Thus, the relationship between the multi-unit heads 20 and the backup roller assemblies 30′ and between multi-unit heads 20′ and backup roller assemblies 30 is one of arcuate alignment with each backup roller matched with a head 21.

Figure 3:
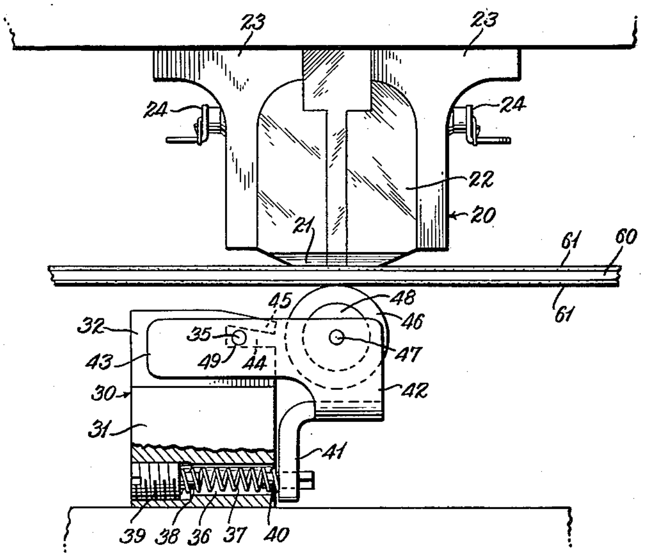
FIGURE 3 is an enlarged view showing the cooperation between each electro-magnetic head and its associated backup roller.
Figure 4:
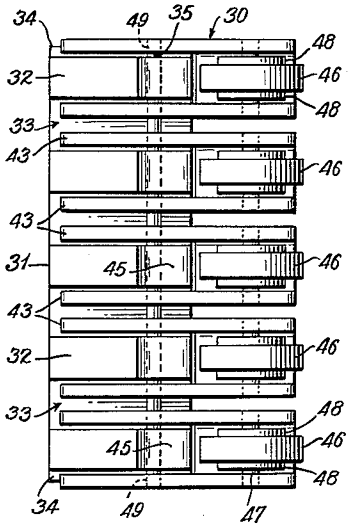
FIGURE 4 is a top plan view of a set of five backup rollers.

Each backup roller assembly 30 consists of a main body 31 defining five upstanding projections 32 which define between them slots 33 and on either end of the assembly a shoulder 34. Slots 44 are cut in the five upstanding projections 32 and a rod 35 projects through the slots. Tabs 45 are created in cutting the slots 44 and are crimped over the pin 35, as will be evident from FIGURE 3. In the bottom of the main body 31 are drilled five bores in alignment with the five projections 32. These bores will be evident from FIGURE 3 and are identified by the numeral 36. Springs 37 are positioned in the bores 36 and are received at one end on pins 38 forming terminal projections of set screws 39 which are threaded into bores 36. Each spring 37 on its other end is received on a terminal projection 40 which is attached to a depending flange 41 of a roller assembly. The roller assembly consists essentially of a U-shaped section 42 from which the flange 41 depends and a pair of arms 43 which project on either side of a projection 32. Each arm 43 is drilled as indicated at 49 and the rod 35 is received in this hole 49. The rollers 46 are mounted on a pin 47 by means of hubs 48 in each of the U-shaped sections 42 so as to be free to rotate. The action of each roller 46 is as follows. The spring 37 urges the flange 41 away from the main body 31 pivoting the pressure roller assembly about the pin 35. The ends of arms 43 limit pivotal movement. Thus, each roller 46 is normally canted relative to the body 31. When the half-plate 11 is pivoted from the position shown in the dotted lines in FIGURE 1, to its position as shown in FIGURE 1, each roller 46 will angularly and radially line up precisely with the gap of an electromagnetic head 21 in one of the several multi-unit heads.

A disk 60 having a magnetizable coating 61 on both sides is clamped by plate 62 so that its center lies on the axis of plates 10 and 11. Disk 60 is about the same diameter as plates 10 and 11. When plate 11 is pivoted toward plate 10 with a disk 60 clamped in place, the rollers 46 will be pivoted against their respective springs 37 loading them. Thus, the rollers 46 will be biased toward their respective heads 21 holding the disk 60 firmly against the heads 21.

The construction and disposition of the multi-unit heads 20 are of particular significance. Each head 21 is of a width slightly less than 0.050 inch. Thus, it will be necessary to maintain on the disk 60 a channel width of approximately 0.050 inch. In order to reduce the danger of overlap between adjacent channels on the disk 60 and cut down cross-talk, it is necessary to maintain successive channels at least 0.020 inch apart. The spacing of the heads 21 in each multi-unit head 20 is 0.350 inch. The mounting of each multi-unit head 20 and 20′ on the plate 10 and the half-plate 11 is such that the outermost heads 21 on successive multi-units 20 in a clockwise direction are radially spaced inwardly a distance of 0.070 inch. Thus, if the multi-unit head 20 at the top of FIGURE 2 is taken as a reference, the outermost head 21 of the next multi-unit head 20 in a clockwise direction is radially spaced inwardly from the outermost head 21 of the reference head by 0.070 inch. Following this to a conclusion, the outermost head 21 of the multi-unit head 20 shown at the bottom of FIGURE 2 is spaced 0.280 inch radially inwardly of the outermost head 21 of the reference multi-unit head 20. Since the spacing between adjacent heads 21 in the same multi-unit is 0.350 inch, the second outermost head 21 of the reference multi-unit head 20 is spaced exactly 0.070 inch radially inwardly of the outermost head 21 of the multi-unit head 20 at the bottom of FIGURE 2. The above arrangement is best graphically illustrated in the schematic of FIGURE 5. In this fashion the five multi-unit heads 20 and their respective heads 21 cooperate to record twenty-five 0.050 inch channels on each side of the disk 60 with adjacent channels spaced 0.020 inch apart (see FIGURE 5) or a total of fifty channels on both sides of disk 60. The arrangement herein described can be easily adapted to provide fifty channels on each side of the disk, a total of one hundred recording channels, by abutting endwise to each set of heads shown at its inner edge an additional set of heads.

The dimensions which have been set forth in the above description are to be understood to be illustrative of the invention and changes in dimensions which do not depart from these teachings are accordingly not precluded from the scope of this invention. Although only a preferred form has been shown, modifications such as are obvious to one skilled in this art from a knowledge of this disclosure are deemed to be within the contemplation and spirit of the invention.

What is claimed is:

1. A system for multi-channel magnetic recording or reproducing comprising a plurality of multi-unit electromagnetic heads fixed in position and lying in a common plane and angularly disposed about a central axis with each said head radially displaced from said central axis differently from the radial displacement of all other heads, and a plurality of backup roller assemblies lying in a common plane parallel and adjacent to the first-mentioned plane with each said assembly angularly aligned with one of said multi-unit electromagnetic heads and each backup roller of each said assembly radially aligned with a unit of the respectively aligned multi-unit electromagnetic head, a magnetizable coated disk rotatably fixed between the parallel and adjacent first and second-mentioned planes, each of said roller assemblies maintaining said disk in operative engagement with its respective angularly aligned head.

2. A system for multi-channel magnetic recording or reproducing comprising a plurality of multi-unit electromagnetic heads fixed in position and lying in a common plane and angularly disposed about a central axis with each said head radially displaced from said axis differently from the radial displacement of all other heads, a second plurality of multi-unit electromagnetic heads lying in a common plane parallel and adjacent to the first-mentioned plane with said second plurality of heads angularly disposed about the same central axis with each said head radially displaced from said axis differently from the radial displacement of all other heads of said second plurality of heads, a magnetizable medium having the sides thereof available to receive magnetic recordings, said medium rotatably mounted between said first and second-mentioned planes in a juxtaposed relationship to said first and second plurality of multi-unit heads, and backup means for each said multi-unit electromagnetic head, each backup means biasing said medium against its respective head, said first and second pluralities of heads fixed on the adjacent facing sides of said common planes.

3. A system as defined in claim 2 wherein said second plurality heads are angularly offset relative to said first-mentioned plurality of heads.

4. A system as defined in claim 2 wherein said backup means comprise a first plurality of backup roller assemblies lying in the first-mentioned common plane with each said assembly angularly aligned with one of said second plurality of heads and each backup roller of each said assembly radially aligned with a unit of the respectively aligned head, and a second plurality of backup roller assemblies lying in said second-mentioned common plane with each said assembly angularly aligned with one of said first mentioned plurality of multi-unit electromagnetic heads and each backup roller of each said assembly radially aligned with a unit of the respectively aligned head.

5. A system for multi-channel magnetic recording or reproducing comprising an axially mounted plate, a plurality of multi-unit electromagnetic heads fixed in position and angularly mounted on said plate about its axis with each said head radially displaced from said axis differently from the radial displacement of all other heads, a second plate co-axially mounted with said first-mentioned plate, a magnetizable coated disk to record signal outputs from the plurality of heads and coaxially mounted between said first and second plate, and a plurality of backup roller assemblies mounted on said second plate with each said assembly angularly aligned with one of said heads and each backup roller of each said assembly radially aligned with a unit of the respectively aligned head to maintain said disk in an abutting relationship therewith.

6. A system as defined in claim 5 wherein said second plate is pivotally hinged to said first-mentioned plate.

7. A system for multi-channel magnetic recording or reproducing comprising an axially mounted plate, a plurality of multi-unit electromagnetic heads fixed in position and angularly mounted on said plate with each said head radially displaced from the axis differently from the radial displacement of all other heads, a second plate co-axially mounted with said first-mentioned plate, a second plurality of multi-unit electromagnetic heads angularly mounted on said second plate angularly offset from the mountings of said first-mentioned plurality of heads with each said head of said second-mentioned plurality radially displaced from the axis differently from the radial displacement of all other heads of said second plurality of heads, a plurality of backup roller assemblies mounted on said first-mentioned plate with each said assembly angularly aligned with one of said second-mentioned plurality of heads and each backup roller of each said assembly radially aligned with a unit of the respectively aligned head, and a second plurality of backup roller assemblies mounted on said second plate with each said assembly angularly aligned with one of said first-mentioned plurality of heads and each backup roller of each said assembly radially aligned with a unit of the respectively aligned head, a magnetizable coated disk co-axially mounted between said first and second plate to record signal outputs from the plurality of heads, and said first and second plurality of backup roller assemblies biasing said disk in operative contact with their respective angularly aligned heads.

8. A system as defined in claim 7 wherein said second plate is pivotally mounted to said first plate.

9. A backup roller assembly for use in a magnetic recording system including an electromagnetic head and a flat recording medium comprising a main body characterized by a vertical projection on each side of which is defined a shoulder, a roller supporting member characterized by a pair of projecting arms and a depending flange, a pin mounting said member for pivotal movement relative to said projection with said arms lying on either side of said projection and in alignment with said shoulders, a roller supported by said member and engaging one side of said recording medium, and resilient means biasing the depending flange of said member to pivot said member to a position where as said roller urges said recording medium into touching contact with said electromagnetic head just prior to the point whereat said arms would abut against said shoulders.

10. A backup roller assembly as defined in claim 9 wherein said body defines a bore and said resilient means is comprised of a spring received in said bore.

11. A system for multi-channel magnetic recording or reproducing comprising a plurality of multi-unit electromagnetic heads fixed in position and lying in a common plane and angularly disposed about a central axis with each said head radially displaced from said axis differently from the radial displacement of all other heads, a second plurality of multi-unit electromagnetic heads lying in a common plane parallel and adjacent to the first-mentioned plane with said second plurality of heads angularly disposed about the same central axis with each said head radially displaced from said axis differently from the radial displacement of all other heads of said second plurality of heads, a magnetizable medium having both sides available to receive magnetic recordings, said medium operatively mounted between said first and second mentioned planes in a juxtaposed relationship to said first and second plurality of heads, and backup means for each said multi-unit electromagnetic head comprising a main body characterized by a vertical projection on each side of which is defined a shoulder, a roller supporting member characterized by a pair of projecting arms and a depending flange, a pin mounting said member for pivotal movement relative to said projection with said arms lying on either side of said projection and in alignment with said shoulders, a roller supported by said member, and resilient means biasing the depending flange of said member to pivot said member to a position where said arms abut against said shoulders, to thereby force said roller against said medium to operatively bias it toward the respective head.

12. A system for multi-channel magnetic recording or receiving, comprising a multiplicity of multi-unit electromagnetic heads fixed in staggered relation to each other in a fixed immovable plane and angularly spaced about a common center with each head staggered radially relative to the other heads, a second multiplicity of multi-unit electromagnetic heads lying in a common normally fixed immovable plane parallel to the first named plane with the second named heads similarly positioned about the common center but so angularly spaced as to avoid angular coincidence with said first named heads, and resilient backup means positioned on each plane in such a manner as to insure angular and axial coincidence with the corresponding head on the other plane, the distance between said parallel planes being such as to provide a separation gap between each electromagnetic head and its corresponding backup means equal in width to a thin finite thickness, and a flat recording disk rotatably installed in said gap with its axis coincident with said common center.

References Cited in the file of this patent

UNITED STATES PATENTS

| | | |
|---|---|---|
| 893,277 | Stuart | July 14, 1908 |
| 1,366,617 | Wier et al. | Jan. 25, 1921 |
| 2,105,016 | Smith | Jan. 11, 1938 |
| 2,510,923 | Brostad et al. | June 6, 1950 |
| 2,537,657 | D'Humy et al. | Jan. 9, 1951 |
| 2,562,707 | Faus | July 31, 1951 |
| 2,620,239 | Gruenias | Dec. 2, 1952 |
| 2,663,598 | Verderber | Dec. 23, 1953 |
| 2,680,785 | Franklin | June 8, 1954 |
| 2,690,913 | Rabinow | Oct. 5, 1954 |
| 2,713,091 | Camras | July 12, 1955 |
| 2,760,772 | McIntyre | Aug. 28, 1956 |
| 2,800,642 | May | July 23, 1957 |

UNITED STATES PATENT OFFICE
CERTIFICATE OF CORRECTION

Patent No. 3,042,755

July 3, 1962

Robert H. Berkshire

It is hereby certified that error appears in the above numbered patent requiring correction and that the said Letters Patent should read as corrected below.

Column 1, line 44, for "will be noted, in FIGURES 1 and 2 there is provided a" read -- pense of providing several apparatus can be profitably --.

Signed and sealed this 4th day of June 1963.

(SEAL)
Attest:

ERNEST W. SWIDER
Attesting Officer

DAVID L. LADD
Commissioner of Patents